(12) United States Patent
Fujino

(10) Patent No.: US 12,387,575 B2
(45) Date of Patent: Aug. 12, 2025

(54) REGISTRATION CHECKING APPARATUS, CONTROL METHOD, AND NON-TRANSITORY STORAGE MEDIUM

(71) Applicant: NEC Corporation, Tokyo (JP)

(72) Inventor: Shozo Fujino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 252 days.

(21) Appl. No.: 17/800,175

(22) PCT Filed: Jan. 8, 2021

(86) PCT No.: PCT/JP2021/000454
§ 371 (c)(1),
(2) Date: Aug. 16, 2022

(87) PCT Pub. No.: WO2021/176840
PCT Pub. Date: Sep. 10, 2021

(65) Prior Publication Data
US 2023/0073167 A1    Mar. 9, 2023

(30) Foreign Application Priority Data
Mar. 2, 2020   (JP) ................................ 2020-035052

(51) Int. Cl.
G06Q 20/20    (2012.01)
G07G 3/00    (2006.01)

(52) U.S. Cl.
CPC ........... *G07G 3/003* (2013.01); *G06Q 20/208* (2013.01)

(58) Field of Classification Search
CPC .... G07G 1/0036; G07G 1/0045; G07G 3/006; G07G 3/003; G06V 40/28; G06V 20/52;
(Continued)

(56) References Cited

U.S. PATENT DOCUMENTS 11,308,297 B2 * 4/2022 Gao .................... G01G 19/4144
11,356,600 B2 * 6/2022 Yadav .................... G06N 20/00
(Continued)

FOREIGN PATENT DOCUMENTS

JP    H07-210757 A    8/1995
JP    2008-538030 A    10/2008
(Continued)

OTHER PUBLICATIONS

International Search Report for PCT Application No. PCT/JP2021/000454, mailed on Mar. 16, 2021.
(Continued)

*Primary Examiner* — Florian M Zeender
*Assistant Examiner* — Milena Racic

(57) ABSTRACT

A registration checking apparatus (2000) determines, for a target transaction, whether a relation between the number of times scanning actions are performed and the number of products registered as checkout targets satisfies a predetermined condition. The scanning action is detected by analyzing a video (12). The registration checking apparatus (2000) performs predetermined output processing when the relation does not satisfy the predetermined condition. The predetermined condition is a condition being satisfied when the number of registered products is equal to or greater than the number of detected scanning actions.

18 Claims, 11 Drawing Sheets

(58) Field of Classification Search
CPC ...... G06V 40/113; G06V 20/41; G06V 20/44; G06V 20/48; G06T 2207/10016; G06T 2207/30232; G06T 7/00; G06Q 20/20; G06Q 20/203; G06Q 20/208; G08B 13/19682; H04N 7/181
See application file for complete search history.

(56) References Cited

U.S. PATENT DOCUMENTS

| | | | |
|---|---|---|---|
| 11,455,499 B2* | 9/2022 | Rodriguez | G06V 10/96 |
| 11,501,614 B2* | 11/2022 | Wen | G07G 3/006 |
| 2018/0096567 A1* | 4/2018 | Farrow | G06V 40/161 |
| 2018/0276456 A1 | 9/2018 | Miyagi | |
| 2020/0210652 A1* | 7/2020 | Guess | G06K 7/1473 |
| 2021/0248885 A1* | 8/2021 | Huang | G06F 18/253 |
| 2021/0264215 A1* | 8/2021 | Barkan | G06N 7/01 |
| 2021/0279505 A1* | 9/2021 | Zhong | G07G 1/0063 |
| 2021/0319420 A1* | 10/2021 | Yu | G06V 20/52 |
| 2023/0020493 A1* | 1/2023 | Migdal | G06Q 20/208 |
| 2023/0215180 A1* | 7/2023 | Kundu | G06Q 20/20 348/150 |
| 2024/0193995 A1* | 6/2024 | Ishida | G06V 40/28 |

FOREIGN PATENT DOCUMENTS

| | | |
|---|---|---|
| JP | 2010-237886 A | 10/2010 |
| JP | 2018-160140 A | 10/2018 |
| JP | 2019-095922 A | 6/2019 |
| JP | 2019-139583 A | 8/2019 |
| JP | 2019-139595 A | 8/2019 |
| JP | 2019-188818 A | 10/2019 |

OTHER PUBLICATIONS

JP Office Action for JP Application No. 2022-505004, mailed on Dec. 17, 2024 with English Translation.

* cited by examiner

REGISTRATION CHECKING APPARATUS, CONTROL METHOD, AND NON-TRANSITORY STORAGE MEDIUM

CROSS REFERENCE TO RELATED APPLICATIONS

This application is a National Stage of International Application No. PCT/JP2021/000454, filed on Jan. 8, 2021, which claims priority from Japanese Patent Application No. 2020-035052, filed on Mar. 2, 2020, the contents of all of which are incorporated herein by reference in their entirety.

TECHNICAL FIELD

The present invention relates to a technology for registering a product as a checkout target.

BACKGROUND ART

When a product is purchased at a store, the product being a purchase target is registered as a checkout target by causing the product to be read by a scanner (such as a barcode reader). An apparatus used for product registration is referred to as a product registration apparatus or the like.

Technologies for detecting a fraudulent operation in scanning of a product in such a product registration apparatus have been developed. Patent Document 1 discloses a technology for detecting fraudulence by comparing the number of scanned products with the number of passing products detected by an optical sensor provided near a scanner. More specifically, in an action of a user causing a scanner to scan a product (hereinafter a scanning action), two sensors each having a reflection-type optical detection structure and being composed of a light emitter and a light receiver are separately provided at locations where a hand of the user passes through. Then, when an object is detected in a predetermined order by the two sensors, the number of passing products is counted.

RELATED DOCUMENT

Patent Document

Patent Document 1: Japanese Patent Application Publication No. 07-210757

SUMMARY OF THE INVENTION

Technical Problem

Since passage of a product is detected by a sensor composed of a light emitter and a light receiver in the invention in Patent Document 1, omitted detection and erroneous detection are considered to be likely to occur. For example, when the body of a user passes in front of the two sensors by coincidence while the user is moving the body, the movement is erroneously detected as a scanning action.

The present invention has been made in view of the aforementioned problem, and an object of the present invention is to provide a technology for precisely checking whether a product is registered as a checkout target.

Solution to Problem

A first registration checking apparatus according to the present invention includes a scanning action detection unit detecting a scanning action by analyzing a video including a hand of a user, a determination unit determining, for a target transaction, whether a relation between a number of times the one or more scanning actions are performed and a number of one or more products registered as one or more checkout targets satisfies a predetermined condition, and an output unit performing predetermined output processing when the relation does not satisfy the predetermined condition.

The predetermined condition is a condition being satisfied when a number of the registered products is equal to or greater than a number of the detected scanning actions.

A second registration checking apparatus according to the present invention includes a scanning action detection unit detecting a scanning action by analyzing a video including a hand of a user, a determination unit determining whether a product is registered as a checkout target in response to the scanning action, and an output unit performing predetermined output processing when a product is not registered as a checkout target in response to the scanning action.

A scanning action is detected in the video when a hand enters a readout area of a scanner and the hand subsequently goes out of the readout area.

A first control method according to the present invention is executed by a computer. The control method includes a scanning action detection step of detecting a scanning action by analyzing a video including a hand of a user, a determination step of determining, for a target transaction, whether a relation between a number of times the one or more scanning actions are performed and a number of one or more products registered as one or more checkout targets satisfies a predetermined condition, and an output step of performing predetermined output processing when the relation does not satisfy the predetermined condition.

The predetermined condition is a condition being satisfied when a number of the registered products is equal to or greater than a number of the detected scanning actions.

A second control method according to the present invention is executed by a computer. The control method includes a scanning action detection step of detecting a scanning action by analyzing a video including a hand of a user, a determination step of determining whether a product is registered as a checkout target in response to the scanning action, and an output step of performing predetermined output processing when a product is not registered as a checkout target in response to the scanning action.

A scanning action is detected in the video when a hand enters a readout area of a scanner and the hand subsequently goes out of the readout area.

Advantageous Effects of Invention

The present invention provides a technology for precisely checking whether a product is registered as a checkout target.

DESCRIPTION OF EMBODIMENTS

Example embodiments of the present invention will be described below by using drawings. Note that, in every drawing, similar components are given similar signs, and description thereof is omitted as appropriate. Further, unless otherwise described, each block in each block diagram represents a function-based configuration rather than a hardware-based configuration. Unless otherwise described, various predetermined values (such as a threshold value) are previously stored in a storage apparatus accessible from a functional component using the values in the following description.

Example Embodiment 1

<Outline>

Figure 1:
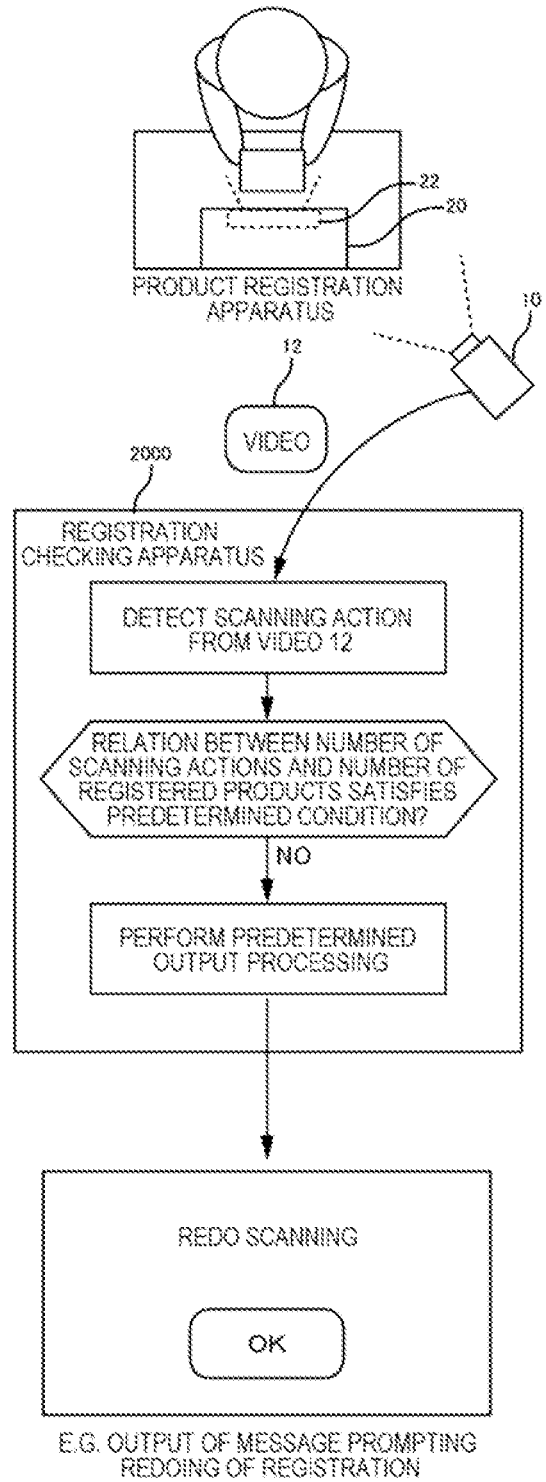
FIG. 1 is a diagram for illustrating an outline of a registration checking apparatus according to an example embodiment 1.

FIG. 1 is a diagram for illustrating an outline of a registration checking apparatus 2000 according to the present example embodiment. Note that FIG. 1 is an exemplification for facilitating understanding of the registration checking apparatus 2000, and functions of the registration checking apparatus 2000 are not limited to those illustrated in FIG. 1.

The registration checking apparatus 2000 is used for checking whether a product is registered as a checkout target (as a price payment target) by an action of causing the product to be scanned by a scanner 22 (hereinafter a scanning action) in a product registration apparatus 20 at a store where the product is purchased. The product registration apparatus 20 is an apparatus used for registering a product as a checkout target. The scanner 22 is a reader reading a predetermined symbol such as a barcode attached to a product, a camera capturing an image of a product, or the like. A product registered as a checkout target is hereinafter also referred to as a registered product.

An apparatus used for product registration (that is, the product registration apparatus 20) and an apparatus used for checkout (price payment) of a registered product may be integrally provided or may be separately provided at a store where the registration checking apparatus 2000 is operated. The apparatus used for checkout of a registered product is referred to as a checkout apparatus or the like. Note that a user performing product registration by operating the product registration apparatus 20 may be a clerk or a customer.

One or more products are registered each time a scanning action is performed when the products are normally scanned by the scanning action. Therefore, when a product is normally scanned in each and every scanning action performed for one transaction, a predetermined relation holds between the number of registered products registered for the transaction and the number of scanning actions performed for the transaction. Specifically, the number of registered products is equal to or greater than the number of scanning actions. Note that the number of registered products becomes greater than the number of scanning actions when a plurality of products are scanned in a single scanning action. Further, "one transaction" refers to a transaction related to one or more products collectively checked out at a time (a transaction related to one or more products purchased by one customer at a time).

In view of the aforementioned relation between the number of scanning actions and the number of registered products, the registration checking apparatus 2000 checks whether a product is normally registered in every scanning action in a certain transaction, by performing the following processing. A transaction being a target of checking on whether a product is normally registered is referred to as a target transaction. The registration checking apparatus 2000 detects a scanning action by analyzing a video 12 acquired from a camera 10 capturing a video of a user action. The registration checking apparatus 2000 determines whether a relation between the number of detected scanning actions and the number of registered products satisfies the predetermined condition. The predetermined condition is a condition that holds when the number of registered products is equal to or greater than the number of scanning actions.

When the aforementioned predetermined condition is not satisfied (in other words, when a scanning action without product registration exists), the registration checking apparatus 2000 performs predetermined output processing. For example, the output processing is output of a message for causing a user to recognize existence of an unregistered product.

Example of Advantageous Effect

The registration checking apparatus 2000 according to the present example embodiment determines whether a relation between the number of scanning actions and the number of registered products satisfies the predetermined condition. Then, when the predetermined condition is not satisfied, the predetermined output processing is performed. The registration checking apparatus 2000 detects a scanning action by analyzing a video 12 in which the scanning action is recorded. Therefore, a scanning action can be detected more precisely compared with a case of detecting a scanning action by using a sensor sensing passage of an object. By extension, the number of scanning actions can be accurately counted. Accordingly, whether a product is registered as a checkout target by a scanning action can be precisely checked.

Details of the present example embodiment will be further described below.

Functional Configuration Example

Figure 2:
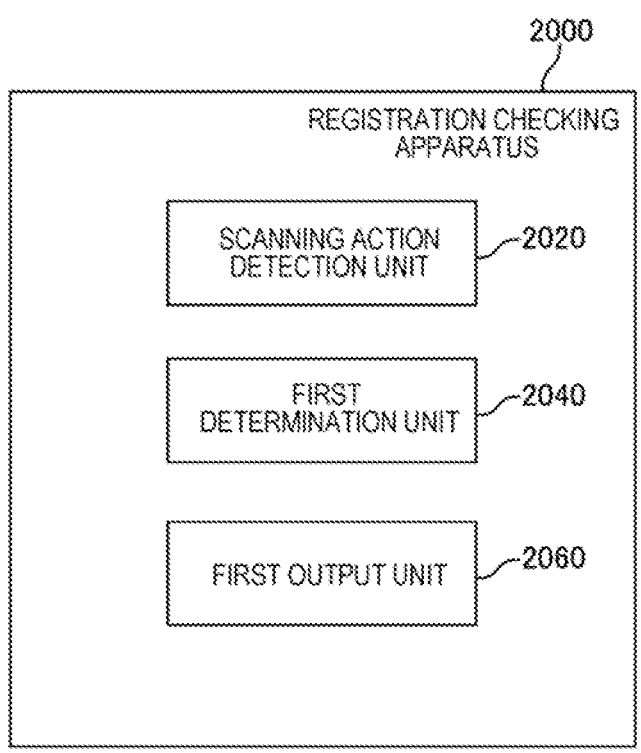
FIG. 2 is a block diagram illustrating a functional configuration of the registration checking apparatus according to the example embodiment 1.

FIG. 2 is a diagram illustrating a functional configuration of the registration checking apparatus 2000 according to the example embodiment 1. The registration checking apparatus 2000 includes a scanning action detection unit 2020, a first determination unit 2040, and a first output unit 2060. The scanning action detection unit 2020 detects a scanning action by analyzing a video 12. The first determination unit 2040 determines whether the number of detected scanning actions and the number of registered products satisfy the predetermined condition. The first output unit 2060 performs the predetermined output processing when the aforementioned predetermined condition is not satisfied.

Hardware Configuration Example of Registration Checking Apparatus 2000

Each functional component in the registration checking apparatus 2000 may be provided by hardware (such as a hardwired electronic circuit) providing the functional component or may be provided by a combination of hardware and software (such as a combination of an electronic circuit and a program controlling the circuit). The case of each functional component in the registration checking apparatus 2000 being provided by a combination of hardware and software will be further described below.

Figure 3:
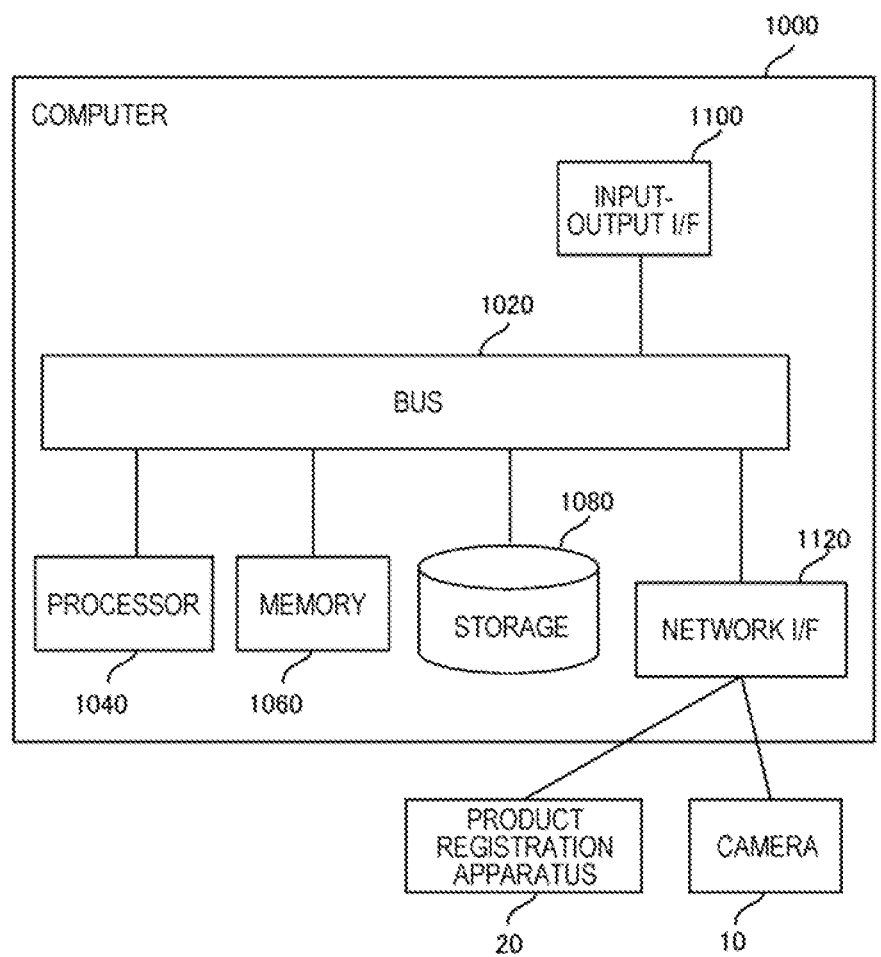
FIG. 3 is a diagram illustrating a computer for providing the registration checking apparatus.

FIG. 3 is a diagram illustrating a computer 1000 for providing the registration checking apparatus 2000. The computer 1000 may be any computer. For example, the computer 1000 is a stationary computer such as a personal computer (PC) or a server machine. In addition, for example, the computer 1000 may be a portable computer such as a smartphone or a tablet terminal. Note that when the registration checking apparatus 2000 and the product registration apparatus 20 are integrally provided, the computer 1000 may be any computer that can provide the product registration apparatus 20 (such as a point of sales (POS) terminal).

The computer 1000 may be a dedicated computer designed to provide the registration checking apparatus 2000 or may be a general-purpose computer. In the latter case, for example, functions of the registration checking apparatus 2000 are provided on the computer 1000 by installing a predetermined application on the computer 1000. The aforementioned application is configured with a program for providing the functional components in the registration checking apparatus 2000.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to transmit and receive data to and from one another. Note that the method of interconnecting the processor 1040 and other components is not limited to the bus connection.

Examples of the processor 1040 include various processors such as a central processing unit (CPU), a graphics processing unit (GPU), and a field-programmable gate array (FPGA). The memory 1060 is a main storage provided by using a random access memory (RAM) or the like. The storage device 1080 is an auxiliary storage provided by using a hard disk, a solid state drive (SSD), a memory card, a read only memory (ROM), or the like.

The input-output interface 1100 is an interface for connecting the computer 1000 to input-output devices. For example, the input-output interface 1100 is connected to an input apparatus such as a keyboard and an output apparatus such as a display apparatus.

The network interface 1120 is an interface for connecting the computer 1000 to a communication network. Examples of the communication network include a local area network (LAN) and a wide area network (WAN). In FIG. 3, the network interface 1120 is connected to the camera 10 and the product registration apparatus 20.

The method for communicably connecting the camera 10 and the product registration apparatus 20 to the computer 1000 is not limited to the method of connection through a network. Further, the camera 10 and the product registration apparatus 20 may not be communicably connected to the computer 1000. In this case, for example, information exchange is performed among the apparatuses through a storage apparatus accessible in common from the apparatuses. Further, the registration checking apparatus 2000 and the product registration apparatus 20 may be integrally provided. In this case, the computer 1000 functions not only as the registration checking apparatus 2000 but also as the product registration apparatus 20.

The storage device 1080 stores program modules providing the functional components in the registration checking apparatus 2000 (program modules providing the aforementioned application). By reading each program module into the memory 1060 and executing the program module, the processor 1040 provides the function related to the program module.

<Flow of Processing>

Figure 4:
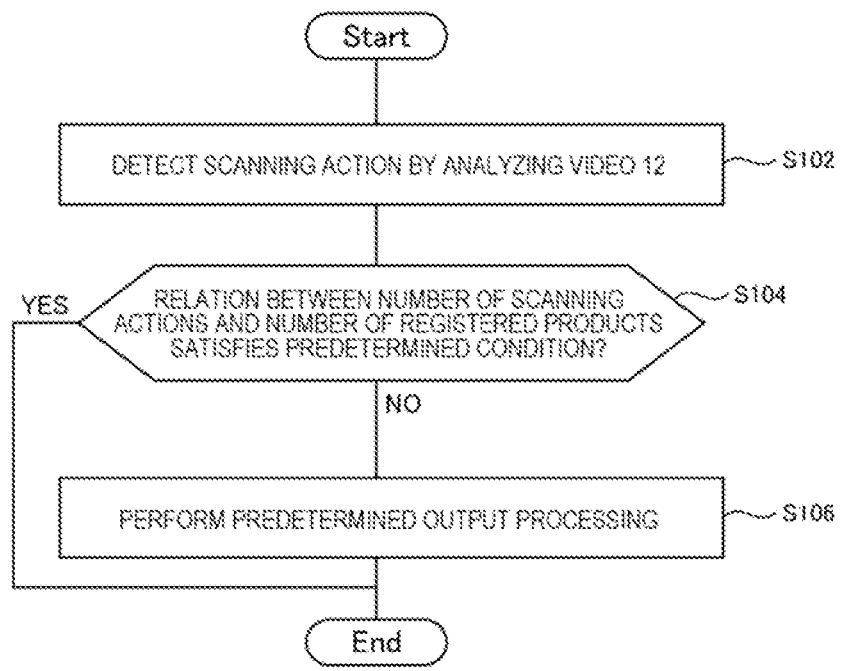
FIG. 4 is a flowchart illustrating a flow of processing executed by the registration checking apparatus according to the example embodiment 1.

FIG. 4 is a flowchart illustrating a flow of processing executed by the registration checking apparatus 2000 according to the example embodiment 1. The scanning action detection unit 2020 determines the number of scanning actions performed for a target transaction by analyzing a video 12 related to the target transaction and detecting scanning actions from the video 12 (S102). The first determination unit 2040 determines whether the number of scanning actions and the number of registered products satisfy the predetermined condition for the target transaction (S104). When the predetermined condition is not satisfied (S104: NO), the first output unit 2060 performs the predetermined output processing (S106). When the predetermined condition is satisfied (S104: YES), the processing in FIG. 4 ends.

Note that the first output unit 2060 may perform some output processing even when the predetermined condition is satisfied. Note that output processing performed when the predetermined condition is satisfied and output processing performed when the predetermined condition is not satisfied are different from each other. For example, a message prompting redoing of product registration is output when the predetermined condition is not satisfied, and a message indicating normal completion of product registration is output when the predetermined condition is satisfied. Further details of the output processing will be described later.

<Flow of Operation on Product Registration Apparatus 20>

In order to facilitate understanding of a usage pattern of the registration checking apparatus 2000, an example of a flow of a user operation performed on the product registration apparatus 20 by a user in a target transaction will be described. The flow of the user operation described here is similar in an example embodiment 2 to be described later.

Figure 5:
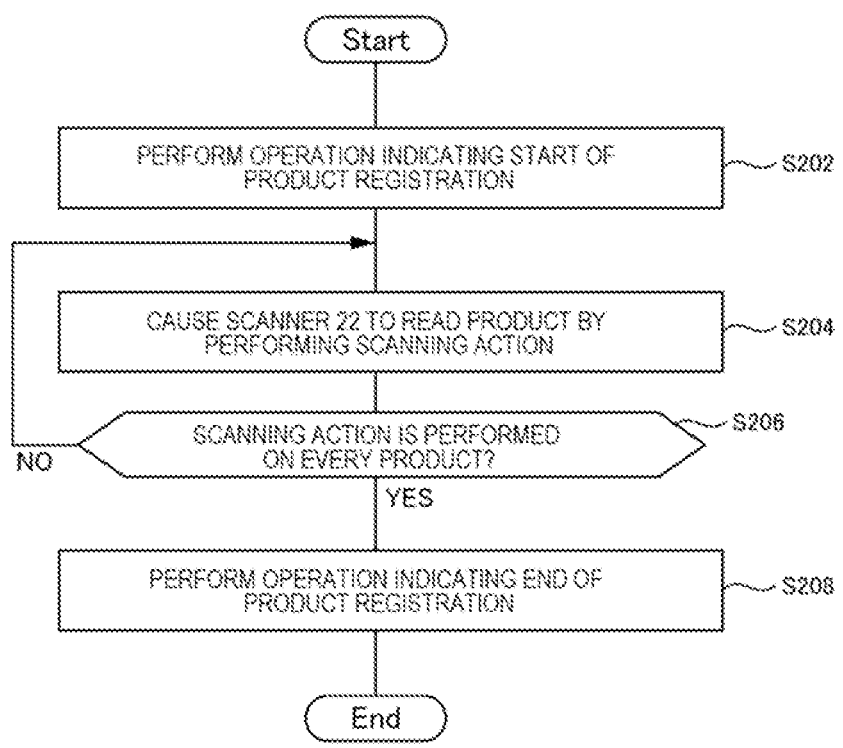
FIG. 5 is a diagram illustrating a flow of a user operation on a product registration apparatus.

FIG. 5 is a diagram illustrating a flow of a user operation on the product registration apparatus 20. A user performs an operation indicating a start of product registration on the product registration apparatus 20 (S202). In response to the operation, the product registration apparatus 20 makes a transition to a state in which product registration is accepted. For example, the operation is an operation of pressing a button displayed as "start scanning of a product" or the like.

The user performs a scanning action on each product to be purchased and causes the scanner 22 to read the product (S204, S206: NO). When the scanning action is completed for every product (S206: YES), the user performs an operation indicating completion of product registration (S208). In response to the operation, the state of the product registration apparatus 20 makes a transition to a state in which product registration is not accepted. Further, a notification indicating the completion of product registration is transmitted from the product registration apparatus 20 to the registration checking apparatus 2000. Note that the notification is unnecessary when the product registration apparatus 20 and the registration checking apparatus 2000 are integrally provided.

In response to the completion of product registration, the registration checking apparatus 2000 compares the number of scanning actions with the number of registered products (S104). Note that it is preferable that detection of scanning actions and counting of the number thereof be performed in parallel while product registration is being performed.

Note that image capture by the camera 10 may be constantly performed or may be performed only during a period from a time point when product registration is started (a registration starting point) to a time point when the product registration is ended (a registration ending point). In FIG. 5, the registration starting point and the registration ending point are time points of S202 and S208, respectively. When image capture is performed only during the period from the registration starting point to the registration ending point, for example, the camera 10 receives, from the product registration apparatus 20, a notification indicating that an operation of indicating a start of product registration is performed and a notification indicating that an operation of indicating an end of product registration. The camera 10 starts image capture in response to receiving the former notification and ends the image capture in response to receiving the latter notification.

<Acquisition of Video 12>

The scanning action detection unit 2020 detects a scanning action from a video 12 related to a target transaction by analyzing the video 12. To do so, the scanning action detection unit 2020 acquires a video 12. The scanning action detection unit 2020 may collectively acquire all images (video frames) constituting the video 12 or may acquire the video frames over a plurality of times. In the latter case, it is preferable that the scanning action detection unit 2020 perform processing of repeatedly acquiring video frames and processing of detecting a scanning action by analyzing already acquired video frames in parallel.

There are various methods for acquiring video frames constituting a video 12 over a plurality of times. For example, every time a new video frame is generated by the camera 10, the scanning action detection unit 2020 acquires the new video frame. In addition, for example, the scanning action detection unit 2020 may collectively acquire unacquired video frames periodically (for example, at a frequency of once every second). For example, when video frames are acquired at a frequency of once every second in a case of a camera with performance of 30 fps (frames/second) being used as the camera 10, video frames are acquired in units of 30 frames.

The scanning action detection unit 2020 may acquire a video 12 from the camera 10 or may acquire a video 12 from an apparatus other than the camera 10. In the latter case, for example, the scanning action detection unit 2020 acquires a video 12 by accessing a storage apparatus into which the video 12 is stored by the camera 10.

The scanning action detection unit 2020 uses, as a video 12, a video during a period from a registration starting point to a registration ending point in a video generated by the camera 10. For example, the scanning action detection unit 2020 acquires information indicating the registration starting point and the registration ending point from the product registration apparatus 20. Then, the scanning action detection unit 2020 acquires, as a video 12, a part between the registration starting point and the registration ending point in the video generated by the camera 10. In addition, for example, image capture by the camera 10 may be performed only during a period from the registration starting point to the registration ending point, as described above. In this case, the scanning action detection unit 2020 acquires, as a video 12, the entire video generated by the camera 10 for the target transaction.

<Detection of Scanning Action: S102>

The scanning action detection unit 2020 detects a scanning action from a video 12 (S102). For example, the scanning action detection unit 2020 includes a detection model for, in response to input of a video in which a scanning action is recorded, detecting the scanning action from the video. "A video in which a scanning action is recorded" means that the video is generated by capturing an image of the scanning action with a camera.

For example, a detection model sequentially accepts time-series video frames constituting a video and, when a scanning action is detected from one or more accepted video frames, provides an output indicating detection of the scanning action. Subsequently, the detection model initializes an internal state and then further accepts subsequent video frames. Thus, one or more scanning actions included in the video 12 are sequentially detected. Note that when a scanning action is detected from a video, it is preferable that the detection model output information indicating the starting point and the ending point of the scanning action (such as frame numbers indicating video frames being the starting point and the ending point of the scanning action, respectively).

The detection model is previously learned by using a video in which a scanning action is recorded. The learning is learned by using at least a video in which a scanning action is recorded, as positive-example training data. Further, negative-example data (that is, a video in which a scanning action is not recorded) may be further used in the learning.

Various videos may be used as training data. For example, as positive-example training data (that is, a video in which a scanning action is recorded), a video including a series of flows including 1) a hand is positioned outside a readout area of the scanner 22 (that is, an area where a product can be scanned), 2) the hand enters the readout area, and 3) the hand exits from the readout area is used.

Note that only an action performed in a state of a hand holding an object may be handled as a scanning action. Specifically, a video including a series of flows including 1) a hand holding an object is positioned outside the readout area of the scanner 22, 2) the hand enters the readout area while holding the object, and 3) the hand exits from the readout area while holding the object is used as positive-example training data. In this case, a video in which an action without the object being held is recorded in any of 1) to 3) is handled as negative-example training data (that is, a video in which a scanning action is not recorded).

Further, only an action performed in a state of a hand being in a predetermined shape may be handled as a scanning action. Specifically, a video including a series of flows including 1) a hand in a predetermined shape is positioned outside the readout area of the scanner 22, 2) the hand enters the readout area while keeping the shape, and 3) the hand exits from the readout area while keeping the shape is used as positive-example training data. In this case, a video in which an action without the shape of a hand being the predetermined shape is recorded in any of 1) to 3) is handled as negative-example training data (that is, a video in which a scanning action is not recorded).

Furthermore, by combining the two examples described above, only an action performed in a state of "a hand in a predetermined shape holding an object" may be handled as a scanning action. In this case, neither a case of the shape of a hand holding an object not being the predetermined shape nor a case of the shape of a hand being the predetermined shape but the hand not holding an object is handled as a scanning action.

In addition, for example, only an action satisfying a condition that a moving direction of a hand is a predetermined direction, a condition that a hand stays in the readout area of the scanner 22 a predetermined time or more, or the like may be handled as a scanning action. Further, when a palm is captured, the action may not be handled as a scanning action.

Note that the method for detecting a scanning action from a video 12 is not limited to the method of using a learned model, and various techniques for detecting a predetermined action from a video may be used.

<Comparison Between the Number of Scanning Actions and the Number of Registered Products: S104>

By comparing the number of times scanning action registration is performed with the number of registered products for a target transaction, the first determination unit 2040 determines whether a relation between the two numbers satisfies the predetermined condition (S104). The predetermined condition is a condition that holds when the number of registered products is equal to or greater than the number of scanning actions. Examples of the predetermined condition include conditions such as "the number of registered products being equal to or greater than the number of scanning actions" and "a value acquired by subtracting the number of scanning actions from the number of registered products being equal to or greater than 0." Note that in a case of the number of products scanned by one scanning action being limited to one (in other words, the scanner 22 can scan only one product at a time), it is preferable that the predetermined condition be a condition that holds when the number of registered products and the number of scanning actions match (a condition such as "the number of registered products matches the scanning actions" or "a value acquired by subtracting the number of scanning actions from the number of registered products is 0").

In order to determine whether the aforementioned predetermined condition is satisfied, the first determination unit 2040 acquires the number of scanning actions and the number of registered products for a target transaction (that is, a currently performed transaction). In other words, for a period from the registration starting point to the registration ending point of the target transaction, the first determination unit 2040 determines the number of scanning actions performed in the period and the number of products registered in the period.

In this respect, as described above, the scanning action detection unit 2020 analyzes a video 12 during a period from the registration starting point to the registration ending point and detects a scanning action included in the video 12. Then, by counting the number of detected scanning actions, the first determination unit 2040 determines the number of scanning actions. Further, the number of registered products can be acquired from the product registration apparatus 20.

Then, the first determination unit 2040 acquires the number of registered products from the product registration apparatus 20.

<Output when Predetermined Condition is not Satisfied: S106>

When the relation between the number of scanning actions and the number of registered products does not satisfy the predetermined condition for the target transaction (S104: NO), the first output unit 2060 performs the predetermined output processing (S106). Various types of processing may be employed as the predetermined output processing. Several examples of the predetermined output processing will be described below.

Predetermined Output Processing Example 1

For example, the first output unit 2060 outputs a message causing a user to recognize existence of an unregistered product to the product registration apparatus 20. For example, the message is displayed on a display apparatus in the product registration apparatus 20 or may be output as a voice from a speaker in the product registration apparatus 20.

Figure 6:
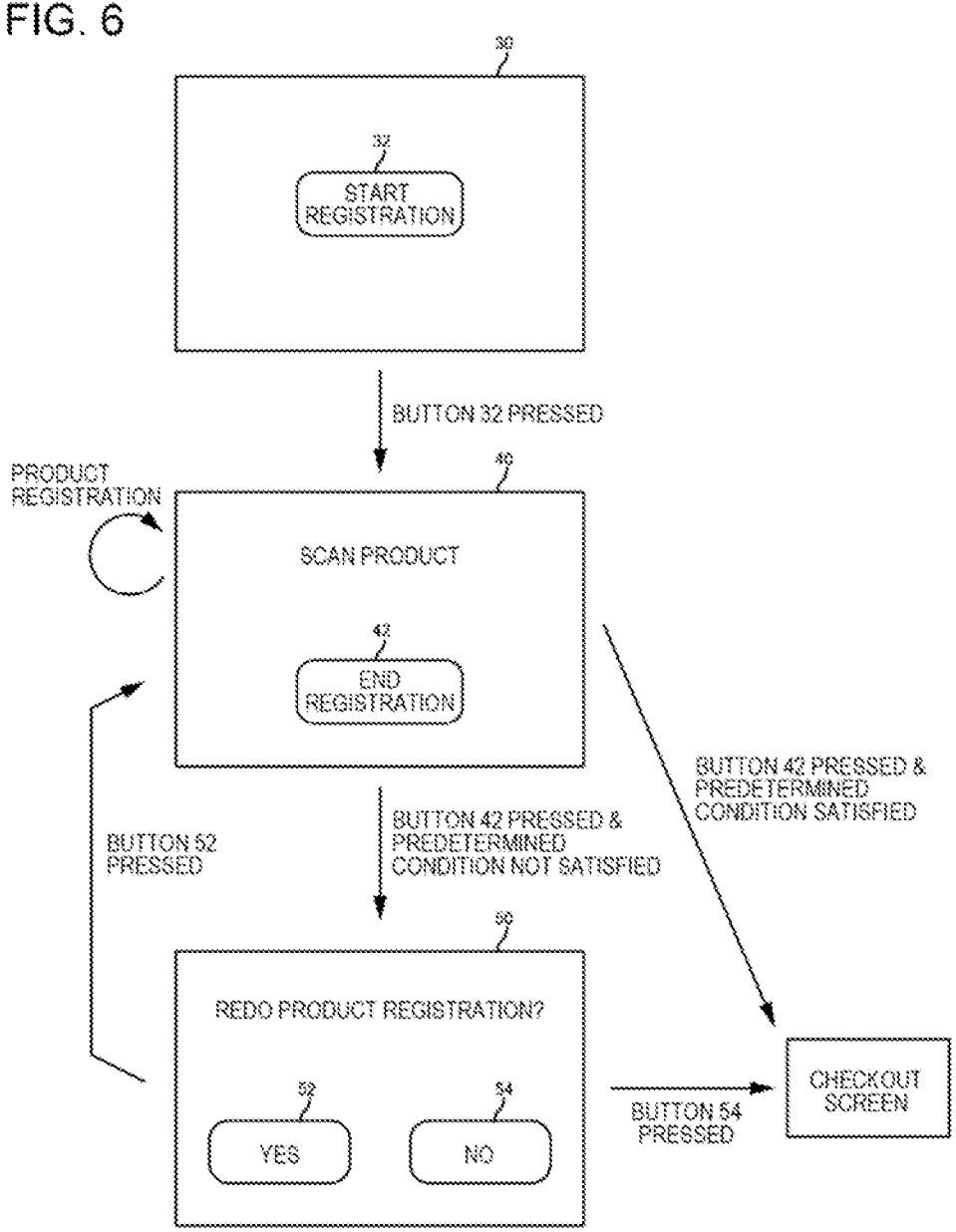
FIG. 6 is a diagram illustrating screen transitions in the product registration apparatus.

The message output to the product registration apparatus 20 will be more specifically described with an example in combination with description of screen transitions in the product registration apparatus 20. FIG. 6 is a diagram illustrating screen transitions in the product registration apparatus 20. Note that each screen in FIG. 6 is simplified for description of the registration checking apparatus 2000, and various types of unillustrated information may be displayed on each screen in actual operation. Further, a case of the product registration apparatus 20 and the checkout apparatus being integrally provided is assumed in FIG. 6.

A screen 30 is a screen displayed on the display apparatus in the product registration apparatus 20 before product registration is started. When a user presses a button 32, the screen displayed on the display apparatus makes a transition to a screen 40. The screen 40 is displayed on the display apparatus in the product registration apparatus 20 while product registration is being performed. Note that the screen 40 may display both the number of detected scanning actions and the number of registered products. In this case, the registration checking apparatus 2000 counts the number of scanning actions in real time. Thus displaying the number of scanning actions and the number of registered products on the screen allows the user to recognize that scanning actions are under surveillance, and therefore an effect of crime prevention can be expected.

When a scanning action is completed for every product, the user presses a button 42. In response to the button 42 being pressed, the registration checking apparatus 2000 determines whether a relation between the number of scanning actions and the number of registered products satisfies the predetermined condition.

When the predetermined condition is satisfied, the target transaction makes a transition from product registration to checkout. Therefore, the screen displayed on the display apparatus makes a transition to a checkout screen (a screen for performing price payment). The checkout screen may employ any configuration.

On the other hand, when the predetermined condition is not satisfied, the screen displayed on the display apparatus makes a transition to a screen 50. The screen 50 includes a message prompting redoing of product registration. When redoing product registration, the user presses a button 52. When the button 52 is pressed, the state of the product registration apparatus 20 makes a transition to the state in which product registration is accepted again. Therefore, the screen displayed on the display apparatus makes a transition to the screen 40.

Note that the screen for redoing product registration may be a screen different from the screen 40. For example, as will be described later, in a case of redoing registration only for an unregistered product, the user needs to be able to recognize the unregistered product. Therefore, information for recognizing the unregistered product is displayed on the screen. Note that the information for recognizing the unregistered product will be described later.

When not redoing product registration, the user presses a button 54. When the button 54 is pressed, the target transaction makes a transition from product registration to checkout. Therefore, the screen displayed on the display apparatus makes a transition to the checkout screen. Note that when the button 54 is not displayed and the predetermined condition is not satisfied, product registration may be forced to be redone.

"Redoing of product registration" may refer to redoing the entire product registration or may be redoing registration only for an unregistered product (in other words, additional registration of a product). In the former case, when the button 52 is pressed, the product registration apparatus 20 entirely clears information about already registered products and makes a transition to a state in which product registration is accepted. Then, the user performs a scanning action again on every product.

On the other hand, when the button 52 is pressed in the case of redoing registration only for an unregistered product, the product registration apparatus 20 makes a transition to a state in which product registration is accepted without clearing information about an already registered product. Then, the user performs a scanning action again only on an unregistered product.

When registration is redone only for an unregistered product, the user needs to recognize the unregistered product. Then, the first output unit 2060 outputs information for the user to recognize the unregistered product. For example, the first output unit 2060 provides the user with an image in which a scanning action performed on the unregistered product is recorded. By viewing the image, the user can recognize which product is unregistered.

An image in which a scanning action on an unregistered product is recorded can be determined by comparing a time point at which each product is registered with a period during which each scanning action is performed. Specifically, when a product is registered by a certain scanning action, registration of the product is performed during a period from the starting point to the ending point of the scanning action (hereinafter a scanning action period). Therefore, when a time point at which a certain product is registered is within the scanning action period, the product is recognized to be registered by the scanning action.

Then, the first output unit 2060 associates a scanning action with a product registered by the scanning action by comparing the period of each scanning action with the time point at which each product is registered. More specifically, the first output unit 2060 associates a scanning action with a product registered during the scanning action period. The processing associates a product with a scanning action by which the product is registered but does not associate a product with a scanning action without product registration. Then, the first output unit 2060 determines a scanning action not being associated with a product to be a scanning action without product registration. Note that, for example, each scanning action period may be determined to be a period from a time point at which a video frame detected as the starting point of the scanning action is generated to a time point at which a video frame detected as the ending point of the scanning action is generated.

Figure 7:
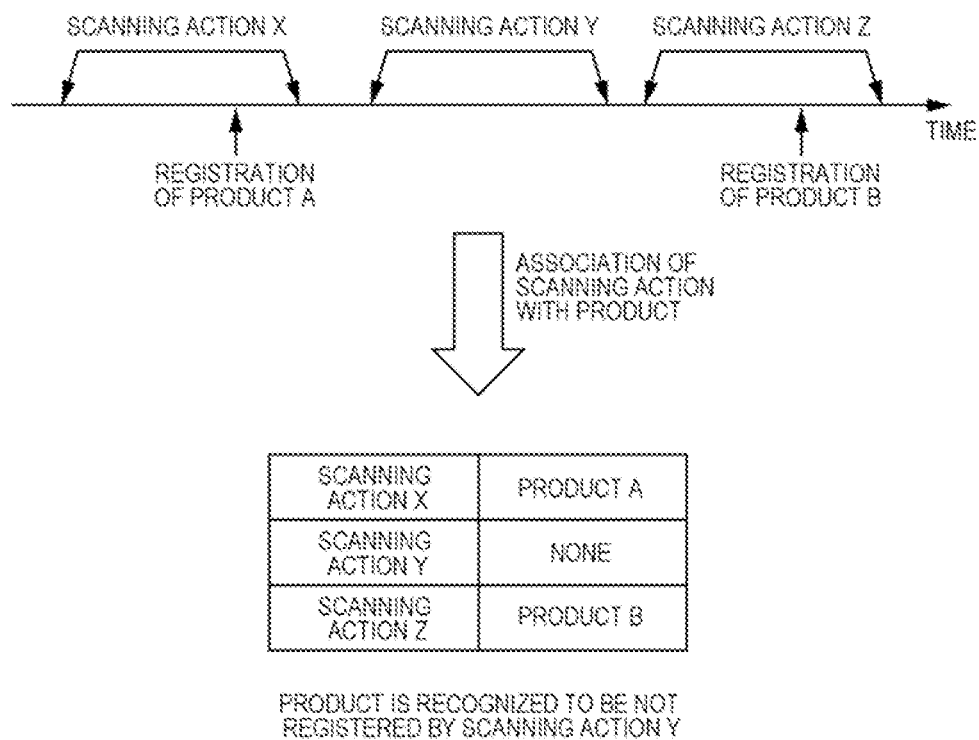
FIG. 7 is a diagram conceptually illustrating association of a scanning action with a product.

FIG. 7 is a diagram conceptually illustrating association of a scanning action with a product. Three scanning actions being scanning actions X to Z are performed in FIG. 7. On the other hand, there are two registered products A and B. Therefore, one scanning action without product registration exists.

The products A and B are registered during the periods of the scanning actions X and Z, respectively. Then, the first output unit 2060 associates the products A and B with the scanning actions X and Z, respectively. The scanning action Y is not associated with any product. Therefore, the first output unit 2060 determines the scanning action Y to be a scanning action without product registration.

The first output unit 2060 outputs information about a scanning action without product registration. For example, the information is an image in which the scanning action is recorded. The image may be a plurality of video frames (that is, a video) during a period from the starting point to the ending point of the scanning action or may be part of video frames (such as one video frame) included in the video.

In the latter case, it is preferable that an image facilitating recognition of a product by a user be output. Then, for example, the first output unit 2060 determines a video frame with the maximum size of an image region representing a product out of video frames constituting a video in which a scanning action without product registration is recorded and outputs the video frame.

When the scanner 22 is provided by a camera, an image generated by the scanner 22 may be output in place of or along with an image in which a scanning action is recorded. An image of a product is considered to be captured larger in an image generated by the scanner 22 compared with an image in which a scanning action is recorded, and therefore recognition of the product becomes easier.

For example, the first output unit 2060 outputs an image generated during a period of a scanning action without product registration out of a plurality of images (video) generated by the scanner 22. In addition, for example, by analyzing a scanning action recorded in a video 12, the first output unit 2060 may determine a time point at which a product is caused to pass through the center of the readout range of the scanner 22 by the scanning action and output an image generated by the scanner 22 at the time point.

Further, each output image may not be an entire image generated by the camera and may be an image acquired by extracting only a partial image region including a product from the entire image. An existing technology can be used as a technology for extracting only a partial image region including a product from an image. For example, an image region including a product can be acquired as an image region including a hand and having a predetermined size. In addition, for example, an image region including a product can be acquired by using a model undergoing learning in such a way as to detect only an image region representing a product from an input image.

Information for recognizing an unregistered product is not limited to information about a scanning action without product registration. For example, the first output unit 2060 may provide a user with a list of registered products. In this case, by comparing the provided list with a product to be purchased by the user, the user can recognize which product is unregistered. For example, it is assumed that the provided list indicates products A and B, and products to be purchased by the user are A, B, and C. In this case, the user can recognize that the product C is unregistered and therefore can redo registration of the product C.

In addition, for example, by analyzing an image in which a scanning action without product registration is recorded, the first output unit 2060 may determine an unregistered product and output identification information (such as a name) of the product. An existing technology can be used as a technology for determining a product included in an image by image analysis.

Predetermined Output Processing Example 2

For example, the first output unit 2060 may provide interested persons of a store such as a clerk and/or a guard with an output allowing recognition of a relation between the number of scanning actions and the number of registered products not satisfying the predetermined condition (that is, an output allowing recognition of existence of a scanning action without product registration). For example, the first output unit 2060 transmits predetermined output information to mobile terminals carried by a clerk and/or a guard. In addition, for example, when the product registration apparatus 20 in which a scanning action without product registration is detected is a product registration apparatus 20 operated by a customer, the first output unit 2060 may output the aforementioned output information to a product registration apparatus 20 operated by a clerk.

Various types of information are included in the output information. For example, the output information includes identification information of a product registration apparatus 20 in which a scanning action without product registration is performed and an image (a facial image in particular) of a user performing the scanning action. For example, an image of a user is acquired from a camera, such as a surveillance camera, being installed in such a way as to be able to capture an image of the face or the like of the user. Further, when the camera 10 is provided in such a way as to be able to capture an image of not only an area around a hand of a user but also the face or the like of the user, the first output unit 2060 may acquire an image of the user from the camera 10.

The predetermined output information may include an image in which a scanning action without product registration is recorded. By browsing the image, a clerk or the like can to some extent recognize whether the scanning action without product registration is an action that may have been performed in order to intentionally prevent a product from being registered or simply an erroneous scan. Note that the method of determining an image in which a scanning action without product registration is recorded is as described above.

Further, the first output unit 2060 may allow a clerk or the like to recognize that the predetermined condition is not satisfied, by using sound, light, or the like. For example, when a product registration apparatus 20 is provided with a lamp visually recognizable from the surroundings, the first output unit 2060 provides an output representing that the predetermined condition is not satisfied in a target transaction in the product registration apparatus 20, by turning on or flickering the lamp by a predetermined method. In addition, for example, a predetermined sound may be output from a speaker provided in the product registration apparatus 20.

<<Output Processing Change Based on Characteristic of Scanning Action>>

Scanning actions without product registration may include a scanning action by which a product is unintentionally not registered (a scanning action being performed with the intention to register a product but failing to register the product) and a scanning action by which a product is intentionally not registered (a scanning action performed without the intention to register a product). The former is hereinafter referred to as a non-fraudulent scanning action, and the latter is referred to as a fraudulent scanning action. The registration checking apparatus 2000 may determine whether a scanning action without product registration is a non-fraudulent scanning action or a fraudulent scanning action and change the output processing, based on the determination result.

For example, when a scanning action without product registration is a non-fraudulent scanning action, the first output unit 2060 performs the output processing in the aforementioned example 1. On the other hand, when the scanning action is a fraudulent scanning action, the first output unit 2060 performs the output processing in the aforementioned example 2 or both the output processing in the example 1 and the output processing in the example 2. Thus, when a user does not perform a fraudulent operation, prompting of redoing of product registration is merely performed; and when a user performs a fraudulent operation, an action such as preparing a framework for crime prevention is enabled by making notification to a clerk and/or the like.

When providing such processing, the scanning action detection unit 2020 is configured to be able to distinguish a non-fraudulent scanning action from a fraudulent scanning action. For example, in addition to detection of a scanning action, a detection model for detecting a scanning action is provided with a function of determining whether a scanning action is a non-fraudulent scanning action or a fraudulent scanning action. In this case, learning of the detection model is performed by using both a video in which a non-fraudulent scanning action is recorded and a video in which a fraudulent scanning action is recorded.

For example, an action handled as a fraudulent scanning action is defined by an administrator of the registration checking apparatus 2000. For example, when a scanning action is performed in a state of a barcode on a product being hidden by a hand in spite of a user checking the position of the barcode, the action is considered to be a fraudulent scanning action. In addition, for example, a scanning action of moving a product in such a way as to avoid the readout area of the scanner 22 and a scanning action of holding stacked products in hand and moving the products in such a way that a product captured by the camera 10 is different from a product read by the scanner 22 are considered to be fraudulent scanning actions.

In addition, for example, whether a scanning action is a fraudulent scanning action may be determined by to what extent information required for product registration is acquired. For example, a scanning action in which only a small part of a barcode on a product is hidden may be estimated to be a non-fraudulent scanning action. On the other hand, a scanning action in which a barcode on a product is mostly or entirely hidden may be estimated to be a fraudulent scanning action. Note that when the scanner 22 is a camera capturing an image of a product, whether a scanning action is a fraudulent scanning action can be estimated by to what degree a product is hidden.

Then, to what degree a product or a barcode on the product is hidden is changed between a video for learning of a non-fraudulent scanning action and a video for learning of a fraudulent scanning action. Thus, a detection model can distinguish a non-fraudulent scanning action from a fraudulent scanning action, based on to what degree a product or a barcode on the product is hidden.

<Processing when Predetermined Condition is Satisfied>

The registration checking apparatus 2000 may perform any type of processing when a relation between the number of scanning actions and the number of registered products satisfies the predetermined condition. For example, the registration checking apparatus 2000 notifies the product registration apparatus 20 that product registration is normally completed. In response to receiving the notification, the product registration apparatus 20 performs processing of completing the product registration. Various existing types of processing may be employed as the processing performed by the product registration apparatus 20 in response to completion of product registration. For example, when the product registration apparatus 20 and a checkout apparatus are integrally provided, the state of the product registration apparatus 20 makes a transition to a state in which price payment is accepted. On the other hand, when the product registration apparatus 20 and a checkout apparatus are separately provided, for example, the product registration apparatus 20 causes the display apparatus to display a message prompting to make a payment through the checkout apparatus. Note that when the product registration apparatus 20 and the registration checking apparatus 2000 are integrally provided, notification from the registration checking apparatus 2000 to the product registration apparatus 20 is unnecessary.

<Surveillance of Action Other than Scanning Action>

Surveillance of an action other than a scanning action may be further performed at a store where the registration checking apparatus 2000 is operated. For example, an action of a customer putting an unregistered product into a bag or the like, and an action of a clerk putting money taken out from a drawer in the checkout apparatus into a pocket are surveilled. The surveillance of actions is performed by analyzing a video acquired from a camera capturing images of actions of a customer and a clerk. The camera may be the camera 10 used in surveillance of a scanning action or may be another camera.

Example Embodiment 2

<Outline>

Figure 8:
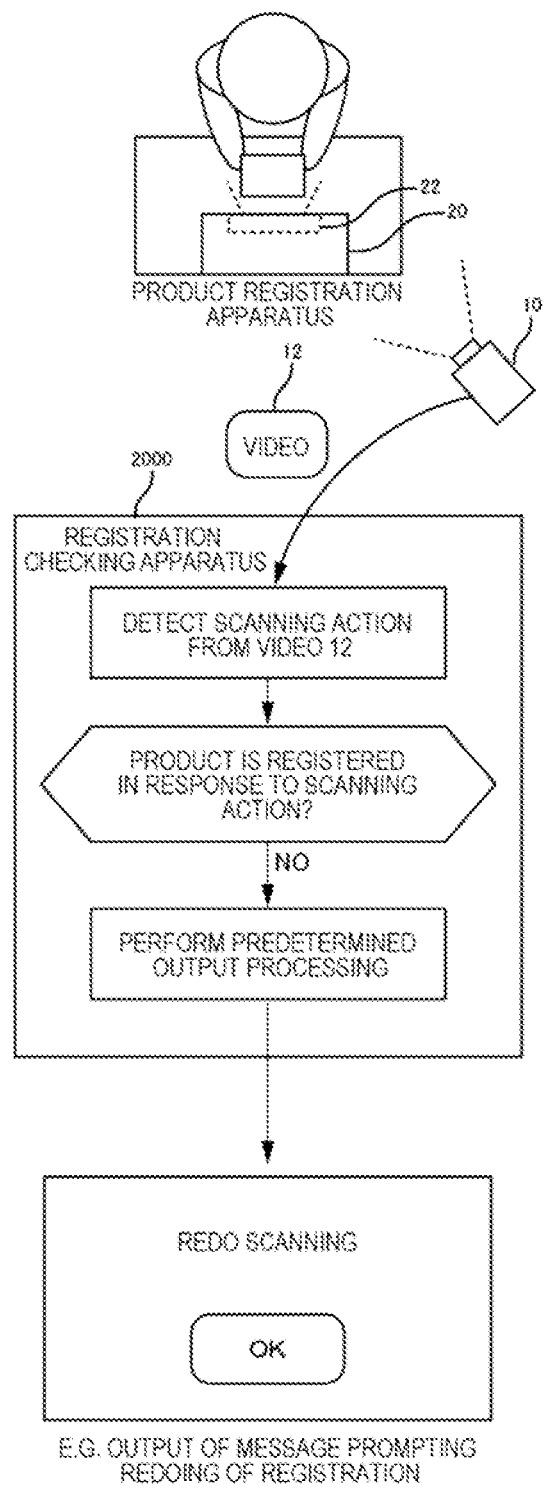
FIG. 8 is a diagram for illustrating an outline of a registration checking apparatus according to an example embodiment 2.

FIG. 8 is a diagram for illustrating an outline of a registration checking apparatus 2000 according to the present example embodiment. Note that FIG. 8 is an exemplification for facilitating understanding of the registration checking apparatus 2000, and functions of the registration checking apparatus 2000 are not limited to those illustrated in FIG. 8. Further, unless otherwise described, the registration checking apparatus 2000 according to the example embodiment 2 has functions similar to those of the registration checking apparatus 2000 according to the example embodiment 1.

The registration checking apparatus 2000 according to the example embodiment 2 checks, for each scanning action instead of each transaction, whether product registration is normally performed in response to the scanning action. Specifically, the registration checking apparatus 2000 detects a scanning action from a video 12 and further determines whether a product is registered as a checkout target in response to the scanning action. Then, when a product is not registered in response to the scanning action (in other words, when a scanning action is detected but product registration is not performed), the registration checking apparatus 2000 performs predetermined output processing. For example, the predetermined output processing is notification for causing a user to recognize that a product is not registered.

Example of Advantageous Effect

The registration checking apparatus 2000 according to the present example embodiment determines whether a product is registered as a checkout target in response to a scanning action and when a product is not registered, performs the predetermined output processing. The registration checking apparatus 2000 detects a scanning action by analyzing a video 12 in which the scanning action is recorded. Therefore, a scanning action can be detected more precisely compared with a case of detecting a scanning action by using a sensor sensing passage of an object. Accordingly, whether a product is registered as a checkout target by a scanning action can be precisely checked.

Functional Configuration Example of Registration Checking Apparatus 2000

Figure 9:
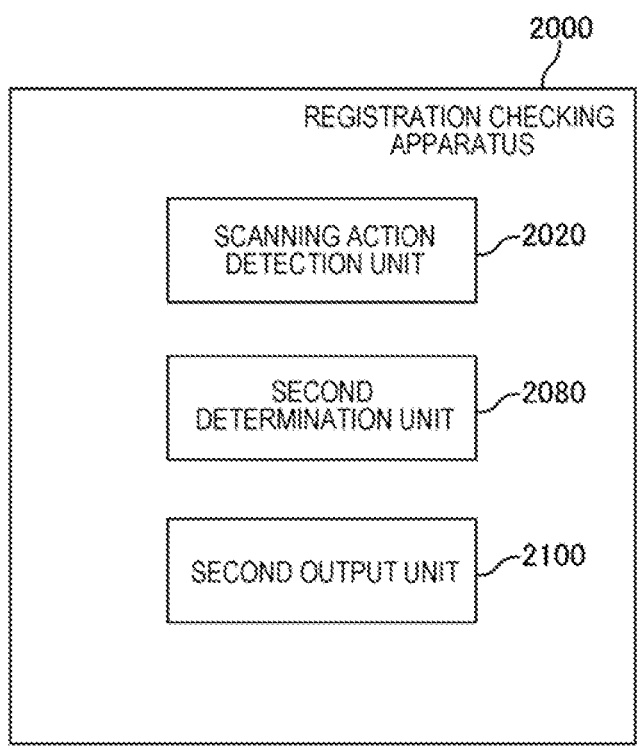
FIG. 9 is a block diagram illustrating a functional configuration of the registration checking apparatus according to the example embodiment 2.

FIG. 9 is a diagram illustrating a functional configuration of the registration checking apparatus 2000 according to the example embodiment 2. The registration checking apparatus 2000 according to the example embodiment 2 includes a scanning action detection unit 2020, a second determination unit 2080, and a second output unit 2100. The scanning action detection unit 2020 according to the example embodiment 2 is similar to the scanning action detection unit 2020 according to the example embodiment 1. The second determination unit 2080 determines whether product registration is performed in response to a detected scanning action. The second output unit 2100 performs the predetermined output processing when product registration is not performed in response to a detected scanning action.

Hardware Configuration Example

For example, a hardware configuration of the registration checking apparatus 2000 according to the present example embodiment is represented by FIG. 3, similarly to the hardware configuration of the registration checking apparatus 2000 according to the example embodiment 1. Note that the storage device 1080 according to the present example embodiment stores a program providing the registration checking apparatus 2000 according to the present example embodiment.

<Flow of Processing>

Figure 10:
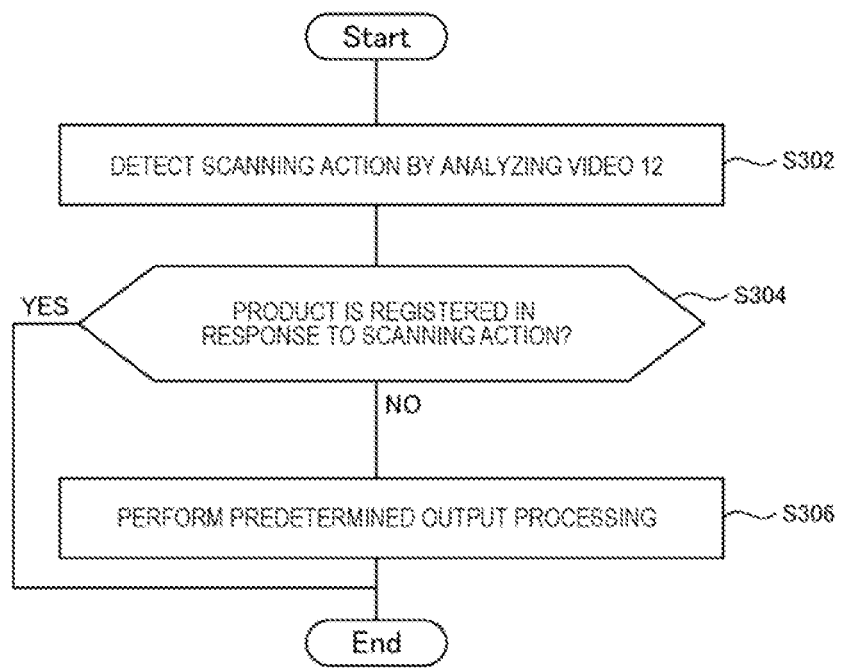
FIG. 10 is a flowchart illustrating a flow of processing executed by the registration checking apparatus according to the example embodiment 2.

FIG. 10 is a flowchart illustrating a flow of processing executed by the registration checking apparatus 2000 according to the example embodiment 2. The scanning action detection unit 2020 detects a scanning action from a video 12 (S302). The second determination unit 2080 determines whether a product is registered in response to the scanning action (S304). When a product is not registered in response to the scanning action (S304: NO), the second output unit 2100 performs the predetermined output processing. The processing in FIG. 10 is repeatedly executed during a period from the start to the end of product registration for a target transaction.

<Determination of Whether a Product is Registered: S304>

The second determination unit 2080 determines whether a product is registered in response to a scanning action (S304). For example, when a scanning action is detected by the scanning action detection unit 2020, the second determination unit 2080 determines whether a new product is registered by a product registration apparatus 20 at or after the preceding determination by the second determination unit 2080. Then, when a new product is registered at or after the preceding determination, the second determination unit 2080 determines that the product is registered in response to the scanning action. On the other hand, when a new product is not registered at or after the preceding determination, the second determination unit 2080 determines that a product is not registered in response to the scanning action. Note that information about product registration can be acquired from the product registration apparatus 20.

In addition, for example, the second determination unit 2080 may determine whether a product registered during a period of a scanning action detected by the scanning action detection unit 2020 exists and when a product registered during the scanning action period exists, may determine that the product is registered in response to the scanning action. Further, when a product registered during the scanning action period does not exist, product registration is determined to be not performed by the scanning action.

<Output Processing by Second Output Unit 2100: S306>

When a product is not registered in response to the scanning action (S304: NO), the second output unit 2100 performs the predetermined output processing. Various types of processing may be employed as the predetermined output processing. Several examples of the predetermined output processing will be described below.

Predetermined Output Processing Example 1

For example, the second output unit 2100 outputs, to the product registration apparatus 20, a message for causing a user to recognize that a product is not registered. For example, the message is displayed on a display apparatus in the product registration apparatus 20 or is output as a voice from a speaker in the product registration apparatus 20.

Figure 11:
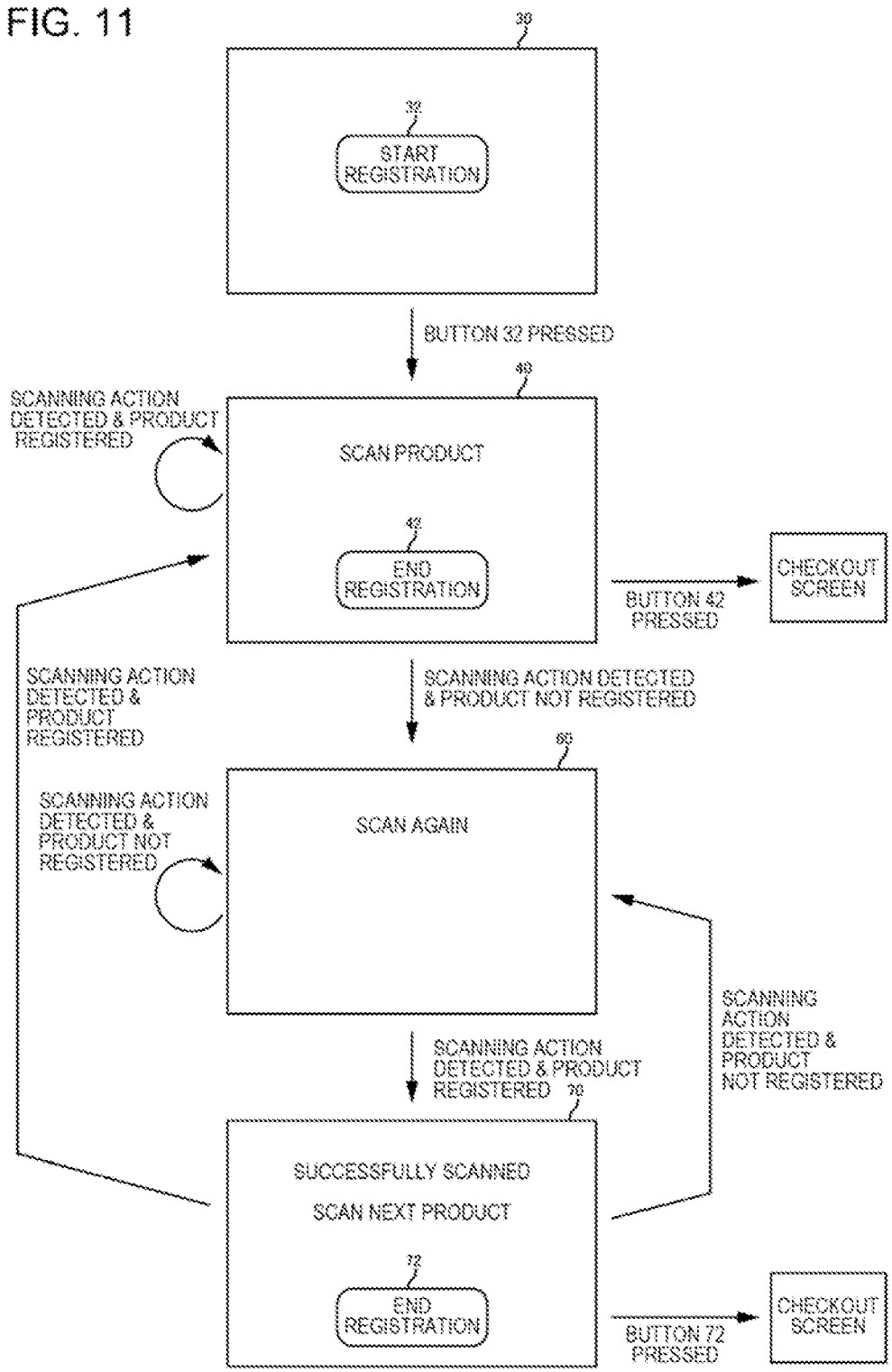
FIG. 11 is a diagram illustrating screen transitions in a product registration apparatus.

The message output to the product registration apparatus 20 will be more specifically described with an example in combination with description of screen transitions in the product registration apparatus 20. FIG. 11 is a diagram illustrating screen transitions in the product registration apparatus 20. Note that each screen in FIG. 11 is simplified for description of the registration checking apparatus 2000, and various types of unillustrated information may be displayed on each screen in actual operation. Further, a case of the product registration apparatus 20 and the checkout apparatus being integrally provided is assumed in FIG. 11.

A screen 30 and a screen 40 are the same as those described in the example embodiment 1 (the screen 30 and the screen 40 in FIG. 6). However, a screen transition after display of the screen 40 in the present example embodiment is different from the case in the example embodiment 1. When the screen 40 is displayed on the display apparatus, a user performs product registration by performing a scanning action. The registration checking apparatus 2000 detects a scanning action by analyzing a video 12 and determines whether a product is registered in response to the scanning action. When a product is registered in response to the scanning action, the product registration apparatus 20 continues to accept scanning of a product. Therefore, the screen 40 continues to be displayed on the display apparatus in the product registration apparatus 20.

On the other hand, when a product is not detected in response to the scanning action, the screen displayed on the display apparatus makes a transition to a screen 60. The screen 60 includes a message prompting redoing of product registration. Then, the user tries product registration by performing a scanning action again on a product intended to be scanned by the product registration apparatus 20 in the immediately preceding scanning action.

The registration checking apparatus 2000 detects a scanning action by analyzing a video 12 and determines whether a product is registered in response to the scanning action. When a product is registered in response to the scanning action, the screen displayed on the display apparatus makes a transition to a screen 70. On the other hand, when a product is not registered in response to the scanning action, the screen 60 continues to be displayed on the display apparatus.

A message indicating that product registration is normally performed is displayed on the screen 70. When ending product registration, the user presses a button 72. When the button 72 is pressed, the screen displayed on the display apparatus makes a transition to a checkout screen. When further performing product registration, the user tries product registration by performing a scanning action. When a product is registered in response to the scanning action, the screen displayed on the display apparatus makes a transition to the screen 40. On the other hand, when a product is not registered in response to the scanning action, the screen displayed on the display apparatus makes a transition to the screen 60.

Note that the message indicating that product registration is normally performed in the example in FIG. 11 is displayed only when product registration is redone. However, the message may be displayed in response to a product being registered regardless of whether the product registration is redone.

Note that whether a product is registered is determined every time a scanning action is performed, according to the present example embodiment, and therefore a scanning action may be redone only on a product intended to be registered by the immediately preceding scanning action in "redoing of product registration."

Predetermined Output Processing Example 2

For example, the second output unit 2100 may provide an output allowing recognition that a product is not registered in response to a scanning action to interested persons of a store such as a clerk and/or a guard. For example, the second output unit 2100 transmits predetermined output information to mobile terminals carried by a clerk and/or a guard. In addition, for example, when the product registration apparatus 20 in which a product is not registered in response to a scanning action is a product registration apparatus 20 operated by a customer, the second output unit 2100 may output the aforementioned output information to a product registration apparatus 20 operated by a clerk.

Various types of information are included in the output information. For example, the output information includes identification information of a product registration apparatus 20 in which a product is not registered in response to a scanning action and an image of a user performing the scanning action. The method for acquiring an image of a user is as described above. Further, the predetermined output information may include an image in which a scanning action without product registration is recorded.

A case in which output information is output to a clerk and/or the like may be limited to a situation in which a product is not registered in response to a scanning action occurring a predetermined number of times or more (twice or more) in a target transaction. For example, when an abnormality occurs in the scanner 22, a situation in which normal registration cannot be performed may occur even when a user repeatedly tries product registration. By making notification to a clerk and/or the like when a situation in which a product is not registered in response to a scanning action occurs a plurality of times, the clerk and/or the like can easily recognize such a situation requiring special attention.

Further, the second output unit 2100 may allow a clerk and/or the like to recognize that a product is not registered in response to a scanning action, by using sound, light, or the like. For example, when the product registration apparatus 20 is provided with a lamp visually recognizable from the surroundings, the second output unit 2100 provides an output representing that a product is not registered in response to a scanning action by turning on or flickering the lamp by a predetermined method. In addition, for example, a predetermined sound may be output from a speaker provided in the product registration apparatus 20.

Note that, as described in the example embodiment 1, the registration checking apparatus 2000 may determine whether a scanning action is a non-fraudulent scanning action or a scanning action and change the output processing, based on the determination result. For example, similarly to the example embodiment 1, when a scanning action without product registration is a non-fraudulent scanning action, the second output unit 2100 performs the output processing in the example 1. On the other hand, when the scanning action is a fraudulent scanning action, the second output unit 2100 performs the output processing in the example 2 or both the output processing in the example 1 and the output processing in the example 2.

While the example embodiments of the present invention have been described above with reference to the drawings, the example embodiments are exemplifications of the present invention, and combinations of the aforementioned example embodiments or various configurations other than those described above may be employed.

The whole or part of the example embodiments disclosed above may also be described as, but not limited to, the following supplementary notes.

1. A registration checking apparatus including:
    a scanning action detection unit detecting a scanning action by analyzing a video including a hand of a user;
    a determination unit determining, for a target transaction, whether a relation between a number of times the one or more scanning actions are performed and a number of one or more products registered as one or more checkout targets satisfies a predetermined condition; and
    an output unit performing predetermined output processing when the relation does not satisfy the predetermined condition, wherein
    the predetermined condition is a condition being satisfied when a number of the registered products is equal to or greater than a number of the detected scanning actions.
2. The registration checking apparatus according to 1, wherein
    a scanning action is detected in the video when a hand enters a readout area of a scanner and the hand subsequently goes out of the readout area.
3. The registration checking apparatus according to 1. or 2., wherein
    the output unit determines a scanning action without product registration by comparing a period during which each scanning action is performed with a time point at which each product is registered and outputs an image including the scanning action.
4. A registration checking apparatus including:
    a scanning action detection unit detecting a scanning action by analyzing a video including a hand of a user;
    a determination unit determining whether a product is registered as a checkout target in response to the scanning action; and
    an output unit performing predetermined output processing when a product is not registered as a checkout target in response to the scanning action, wherein a scanning action is detected in the video when a hand enters a readout area of a scanner and the hand subsequently goes out of the readout area.
5. The registration checking apparatus according to any one of 2. to 4., wherein
    a scanning action is detected in the video when a hand holding a product enters a readout area of a scanner and the hand subsequently goes out of the readout area.
6. The registration checking apparatus according to any one of 2. to 5., wherein
    a scanning action is detected in the video when a hand with a shape satisfying a predetermined criterion enters a readout area of a scanner and the hand subsequently goes out of the readout area.
7. The registration checking apparatus according to any one of 1. to 6., wherein
    the scanning action detection unit detects the scanning action by using a detection model for detecting a scanning action from an input video, and
    the detection model is a model learned by using a video acquired by capturing an image of a scanning action with a camera.
8. The registration checking apparatus according to any one of 1. to 7., wherein
    the output unit outputs a message prompting redoing of scanning of a product.
9. The registration checking apparatus according to any one of 1. to 8., wherein
    the scanning action detection unit determines which of a fraudulent scanning action and a non-fraudulent scanning action a scanning action is, and
    the output unit performs output processing in such a way that output processing when a scanning action without product registration is a fraudulent scanning action and output processing when a scanning action without product registration is a non-fraudulent scanning action are different from each other.
10. A control method executed by a computer, the control method including:
    a scanning action detection step of detecting a scanning action by analyzing a video including a hand of a user;
    a determination step of determining, for a target transaction, whether a relation between a number of times the one or more scanning actions are performed and a number of one or more products registered as one or more checkout targets satisfies a predetermined condition; and
    an output step of performing predetermined output processing when the relation does not satisfy the predetermined condition, wherein the predetermined condition is a condition being satisfied when a number of the registered products is equal to or greater than a number of the detected scanning actions.

11. The control method according to 10., wherein
    a scanning action is detected in the video when a hand enters a readout area of a scanner and the hand subsequently goes out of the readout area.

12. The control method according to 10. or 11., further including,
    in the output step, determining a scanning action without product registration by comparing a period during which each scanning action is performed with a time point at which each product is registered and outputting an image including the scanning action.

13. A control method executed by a computer, the control method including:
    a scanning action detection step of detecting a scanning action by analyzing a video including a hand of a user;
    a determination step of determining whether a product is registered as a checkout target in response to the scanning action; and
    an output step of performing predetermined output processing when a product is not registered as a checkout target in response to the scanning action, wherein
    a scanning action is detected in the video when a hand enters a readout area of a scanner and the hand subsequently goes out of the readout area.

14. The control method according to any one of 11. to 13., wherein
    a scanning action is detected in the video when a hand holding a product enters a readout area of a scanner and the hand subsequently goes out of the readout area.

15. The control method according to any one of 11. to 14., wherein
    a scanning action is detected in the video when a hand with a shape satisfying a predetermined criterion enters a readout area of a scanner and the hand subsequently goes out of the readout area.

16. The control method according to any one of 10. to 15., further including,
    in the scanning action detection step, detecting the scanning action by using a detection model for detecting a scanning action from an input video, wherein
    the detection model is a model learned by using a video acquired by capturing an image of a scanning action with a camera.

17. The control method according to any one of 10. to 16., further including,
    in the output step, outputting a message prompting redoing of scanning of a product.

18. The control method according to any one of 10. to 17., further including:
    in the scanning action detection step, determining which of a fraudulent scanning action and a non-fraudulent scanning action a scanning action is; and,
    in the output step, performing output processing in such a way that output processing when a scanning action without product registration is a fraudulent scanning action and output processing when a scanning action without product registration is a non-fraudulent scanning action are different from each other.

19. A program causing a computer to execute the control method according to any one of 10. to 18.

This application claims priority based on Japanese Patent Application No. 2020-035052 filed on Mar. 2, 2020, the disclosure of which is hereby incorporated by reference thereto in its entirety.

REFERENCE SIGNS LIST

10 Camera
12 Video
20 Product registration apparatus
22 Scanner
30 Screen
32 Button
40 Screen
42 Button
50 Screen
52 Button
54 Button
60 Screen
70 Screen
72 Button
1000 Computer
1000 Computer
1020 Bus
1040 Processor
1060 Memory
1080 Storage device
1100 Input-output interface
1120 Network interface
2000 Registration checking apparatus
2020 Scanning action detection unit
2040 First determination unit
2060 First output unit
2080 Second determination unit
2100 Second output unit

What is claimed is:
1. A registration checking apparatus comprising:
at least one memory storing instructions; and
at least one processor configured to execute the instructions to perform operations comprising:
detecting, by the registration checking apparatus and for a target transaction that is performed to collectively check out one or more products, one or more scanning actions by analyzing a video including a hand of a user, wherein the one or more products are registered as one or more checkout targets of the target transaction via the one or more scanning actions;
counting, by the registration checking apparatus, a number of times the one or more scanning actions have been detected;
determining, by the registration checking apparatus and for the target transaction, whether a relation between the number of times the one or more scanning actions have been detected and a number of the one or more products that have been registered as the one or more checkout targets; and
performing, by the registration checking apparatus, predetermined output processing when the relation does not satisfy the predetermined condition, wherein
the predetermined condition is a condition that is satisfied when the number of the one or more products that have been registered is equal to or greater than the number of the one or more scanning actions that have been detected,
the predetermined output processing includes displaying a message causing the user to recognize existence of an unregistered product and prompting redoing of scanning of the unregistered product and information for the user to recognize the unregistered product, on a display apparatus of a product registration apparatus, the video is constantly captured while the one or more products are registered via the one or more scanning actions, and detecting the one or more scanning actions and counting of the number of times the one or more scanning actions have been detected is performed in real-time while the one or more products are registered via the one or more scanning actions.

2. The registration checking apparatus according to claim 1, wherein
the one or more scanning actions are detected in the video when the hand enters a readout area of a scanner and the hand subsequently exits the readout area.

3. The registration checking apparatus according to claim 1, wherein
the operations further comprise determining a scanning action of the one or more scanning actions is without product registration by comparing a period during which each scanning action is performed with a time point at which a corresponding product is registered and outputting an image including the scanning action.

4. The registration checking apparatus according to claim 2, wherein
the one or more scanning actions are detected in the video when the hand holding a product enters the readout area and the hand subsequently exits the readout area.

5. The registration checking apparatus according to claim 2, wherein
the one or more scanning actions are detected in the video when the hand with a shape satisfying a predetermined criterion enters the readout area of a scanner and the hand subsequently exits the readout area.

6. The registration checking apparatus according to claim 1, wherein
detecting the one or more scanning actions comprises detecting the one or more scanning actions by using a detection model for detecting the one or more scanning actions from an input video, and
the detection model is learned by using a video acquired by capturing an image of a scanning action with a camera.

7. The registration checking apparatus according to claim 1, wherein
performing the predetermined output processing comprises outputting a message prompting redoing of scanning of a product.

8. The registration checking apparatus according to claim 1, wherein
the operations further comprise determining which of a fraudulent scanning action and a non-fraudulent scanning action a scanning action of the one or more scanning actions is, and
performing the predetermined output processing comprises performing output processing in such a way that the output processing when a scanning action of the one or more scanning actions that is without product registration is a fraudulent scanning action and the output processing when a scanning action of the one or more scanning actions that is without product registration is a non-fraudulent scanning action are different from each other.

9. The registration checking apparatus according to claim 1, wherein
the information for recognizing the unregistered product is at least one of an image in which a scanning action performed on the unregistered product is recorded, an image generated by a scanner for registering products, and identification information of the unregistered product.

10. A control method performed by a computer functioning as a registration checking apparatus, the control method comprising:
detecting, by the registration checking apparatus and for a target transaction that is performed to collectively check out one or more products, one or more scanning actions by analyzing a video including a hand of a user, wherein the one or more products are registered as one or more checkout targets of the target transaction via the one or more scanning actions;
counting, by the registration checking apparatus, a number of times the one or more scanning actions have been detected;
determining, by the registration checking apparatus and for the target transaction, whether a relation between the number of times the one or more scanning actions have been detected and a number of the one or more products that have been registered as the one or more checkout targets; and
performing, by the registration checking apparatus, predetermined output processing when the relation does not satisfy the predetermined condition, wherein
the predetermined condition is a condition that is satisfied when the number of the one or more products that have been registered is equal to or greater than the number of the one or more scanning actions that have been detected,
the predetermined output processing includes displaying a message causing the user to recognize existence of an unregistered product and prompting redoing of scanning of the unregistered product and information for the user to recognize the unregistered product, on a display apparatus of a product registration apparatus,
the video is constantly captured while the one or more products are registered via the one or more scanning actions, and
detecting the one or more scanning actions and counting of the number of times the one or more scanning actions have been detected is performed in real-time while the one or more products are registered via the one or more scanning actions.

11. The control method according to claim 10, wherein
the one or more scanning actions are detected in the video when the hand enters a readout area of a scanner and the hand subsequently exits the readout area.

12. The control method according to claim 10, further comprising
determining a scanning action of the one or more scanning actions is without product registration by comparing a period during which each scanning action is performed with a time point at which a corresponding product is registered and outputting an image including the scanning action.

13. The control method according to claim 11, wherein
the one or more scanning actions are detected in the video when the hand holding a product enters the readout area and the hand subsequently exits the readout area.

14. The control method according to claim 11, wherein
the one or more scanning actions are detected in the video when the hand with a shape satisfying a predetermined criterion enters the readout area of a scanner and the hand subsequently exits the readout area.

15. The control method according to claim 10, wherein
detecting the one or more scanning actions comprises
detecting the one or more scanning actions by using a
detection model for detecting the one or more scanning
actions from an input video, and
the detection model is learned by using a video acquired
by capturing an image of a scanning action with a
camera.

16. The control method according to claim 10, wherein
performing the predetermined output processing comprises outputting a message prompting redoing of scanning of a product.

17. The control method according to claim 10, further comprising
determining which of a fraudulent scanning action and a non-fraudulent scanning action a scanning action of the one or more scanning actions is,
wherein performing the predetermined output processing comprises performing output processing in such a way that the output processing when a scanning action of the one or more scanning actions that is without product registration is a fraudulent scanning action and the output processing when a scanning action of the one or more scanning actions that is without product registration is a non-fraudulent scanning action are different from each other.

18. A non-transitory storage medium storing a program executable by a computer to perform a control method to function as a registration checking apparatus, the control method comprising:
detecting, by the registration checking apparatus and for a target transaction that is performed to collectively check out one or more products, one or more scanning actions by analyzing a video including a hand of a user, wherein the one or more products are registered as one or more checkout targets of the target transaction via the one or more scanning actions;
counting, by the registration checking apparatus, a number of times the one or more scanning actions have been detected;
determining, by the registration checking apparatus and for the target transaction, whether a relation between the number of times the one or more scanning actions have been detected and a number of the one or more products that have been registered as the one or more checkout targets; and
performing, by the registration checking apparatus, predetermined output processing when the relation does not satisfy the predetermined condition, wherein
the predetermined condition is a condition that is satisfied when the number of the one or more products that have been registered is equal to or greater than the number of the one or more scanning actions that have been detected,
the predetermined output processing includes displaying a message causing the user to recognize existence of an unregistered product and prompting redoing of scanning of the unregistered product and information for the user to recognize the unregistered product, on a display apparatus of a product registration apparatus,
the video is constantly captured while the one or more products are registered via the one or more scanning actions, and
detecting the one or more scanning actions and counting of the number of times the one or more scanning actions have been detected is performed in real-time while the one or more products are registered via the one or more scanning actions.

* * * * *